(12) United States Patent
Houston et al.

(10) Patent No.: US 8,232,782 B2
(45) Date of Patent: Jul. 31, 2012

(54) SYSTEM AND METHOD FOR EQUALIZING THE SMALL SIGNAL RESPONSE OF VARIABLE PHASE VOLTAGE REGULATORS

(75) Inventors: M. Jason Houston, Cary, NC (US); Bogdan M. Duduman, Raleigh, NC (US); Weihong Qiu, San Jose, CA (US)

(73) Assignee: Intersil Americas Inc., Milpitas, CA (US)

( * ) Notice: Subject to any disclaimer, the term of this patent is extended or adjusted under 35 U.S.C. 154(b) by 355 days.

(21) Appl. No.: 12/761,914

(22) Filed: Apr. 16, 2010

(65) Prior Publication Data
US 2011/0109284 A1    May 12, 2011

Related U.S. Application Data

(60) Provisional application No. 61/260,720, filed on Nov. 12, 2009.

(51) Int. Cl.
  *G05F 1/575* (2006.01)
  *G05F 1/656* (2006.01)
(52) U.S. Cl. .................. 323/272; 323/285

(58) Field of Classification Search .............. 323/225, 323/271, 272, 284, 285, 350
See application file for complete search history.

(56) References Cited

U.S. PATENT DOCUMENTS

| | | | |
|---|---|---|---|
| RE39,976 E * | 1/2008 | Schiff et al. | 323/285 |
| 7,535,211 B2 | 5/2009 | Isham | |
| 7,812,581 B2 * | 10/2010 | Qiu et al. | 323/272 |
| 8,085,015 B2 * | 12/2011 | Lee | 323/272 |
| 8,183,842 B2 * | 5/2012 | Ni et al. | 323/272 |

* cited by examiner

*Primary Examiner* — Gary L Laxton
(74) *Attorney, Agent, or Firm* — Fogg & Powers LLC (57) ABSTRACT

A control circuit for a variable phase voltage regulator comprises an error amplifier to generate a difference signal based on a difference between a reference voltage and a signal representative of a voltage at an output node of the variable phase voltage regulator. The control circuit also comprises a variable phase compensator to amplify the difference signal to produce a modified difference signal to compensate for effects of varying the number of active phases in the variable phase voltage regulator, wherein the amplification is proportional to a ratio of total number of phases in the variable phase voltage regulator to number of active phases in the variable phase voltage regulator.

22 Claims, 5 Drawing Sheets

SYSTEM AND METHOD FOR EQUALIZING THE SMALL SIGNAL RESPONSE OF VARIABLE PHASE VOLTAGE REGULATORS

CROSS REFERENCE TO RELATED APPLICATIONS

This application is related to U.S. provisional patent application Ser. No. 61/260,720 entitled "EQUALIZING THE SMALL SIGNAL RESPONSE OF VARIABLE PHASE VOLTAGE REGULATORS," filed on Nov. 12, 2009 and referred to herein as the '720 application. The '720 application is hereby incorporated herein by reference. The present application hereby claims priority to U.S. Provisional Patent Application No. 61/260,720.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

As used herein, the terms "variable phase voltage regulator" and "multi-phase voltage regulator" are used interchangeably to refer to a voltage regulator having a plurality of phases, each of which can be selectively turned on or off. Hence, as used herein, the terms "N-phase mode" and "N-phase operation" refer to the number of active or "turned-on" phases at a given point in time, where N is an integer number. For example, 3-phase operation refers to an operational mode of a voltage regulator in which 3 phases are active or turned on. Similarly, the terms "all-phase mode" and "all-phase operation" refer to an operational mode in which all of the phases of the voltage regulator are active.

Figure 1:
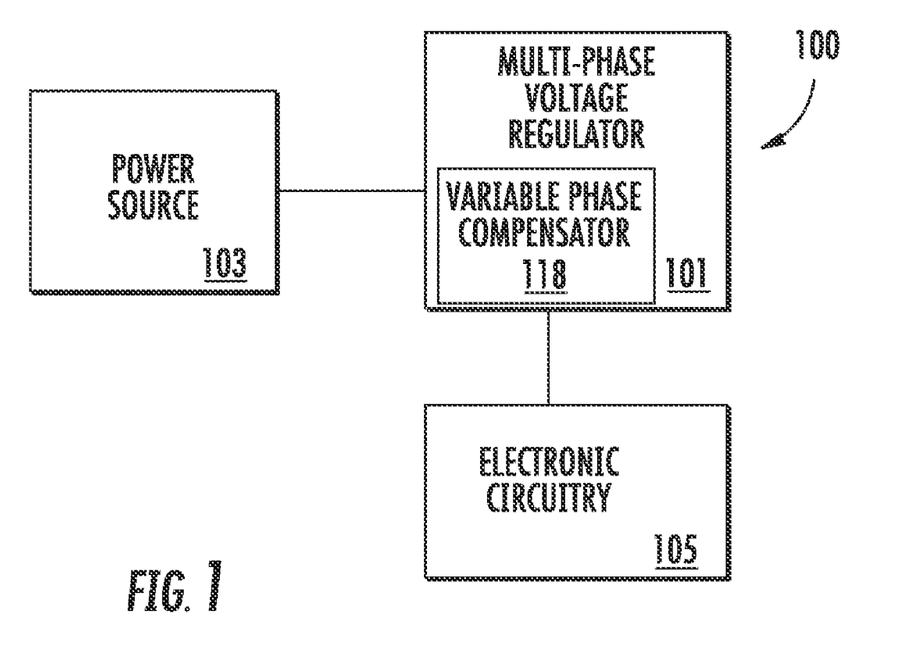
FIG. 1 is block diagram of one embodiment of a system utilizing a variable phase voltage regulator.

FIG. 1 is a block diagram of one embodiment of a system 100 utilizing a variable phase voltage regulator 101. The system 100 also includes a power source 103 and a load 105. The load 105 draws power from the power source 103 via the variable phase voltage regulator 101. For example, the load 105 can be implemented as, but is not limited to, one or more of a processor (e.g. a microprocessor, digital signal processor, embedded processor, etc.), a display device (e.g. a light-emitting diode or LED display, a cathode ray tube or CRT display, a liquid crystal display or LCD, etc.), a memory device (e.g. conventional hard disk, Electrically Erasable Programmable ROM or EEPROM, flash memory, etc.), or other applicable peripheral devices, as known to one of skill in the art. Additionally, the power source 103 can be implemented as, but is not limited to, a conventional Alternating Current (AC) to Direct Current (DC) power supply or battery.

The variable phase voltage regulator 101 regulates an input voltage from the power source 103 for use by the load 105. The variable phase voltage regulator 101 is operable to selectively turn on and off one or more of the plurality of phases. When the number of active phases is reduced, the equivalent output inductance of the variable phase voltage regulator increases. This increase in equivalent output inductance shifts the inductor/capacitor (LC) resonant frequency of the variable phase voltage regulator lower and can reduce the overall bandwidth and phase margin of the variable phase voltage regulator. The reduced bandwidth can manifest in slower load transient response and the need for more output capacitors to improve regulation.

To compensate for this effect, the embodiments of a non-conventional variable phase voltage regulator, described herein, include a variable phase compensator 118 to adjust a gain in the variable phase voltage regulator 101 to substantially negate the effect of the change in equivalent output inductance. In particular, the gain is proportional to (e.g. a constant multiple of) the ratio of the number of active phases to the total number of phases in the voltage regulator. Furthermore, the embodiments described herein enable operation in more than 2 modes of operation. For example, in one embodiment of a variable phase voltage regulator having 4 phases, the variable phase voltage regulator is able to operate in 1-phase, 2-phase, 3-phase and 4-phase operation by adjusting the applied gain to compensate for the effects of changing the number of active phases.

Figure 2:
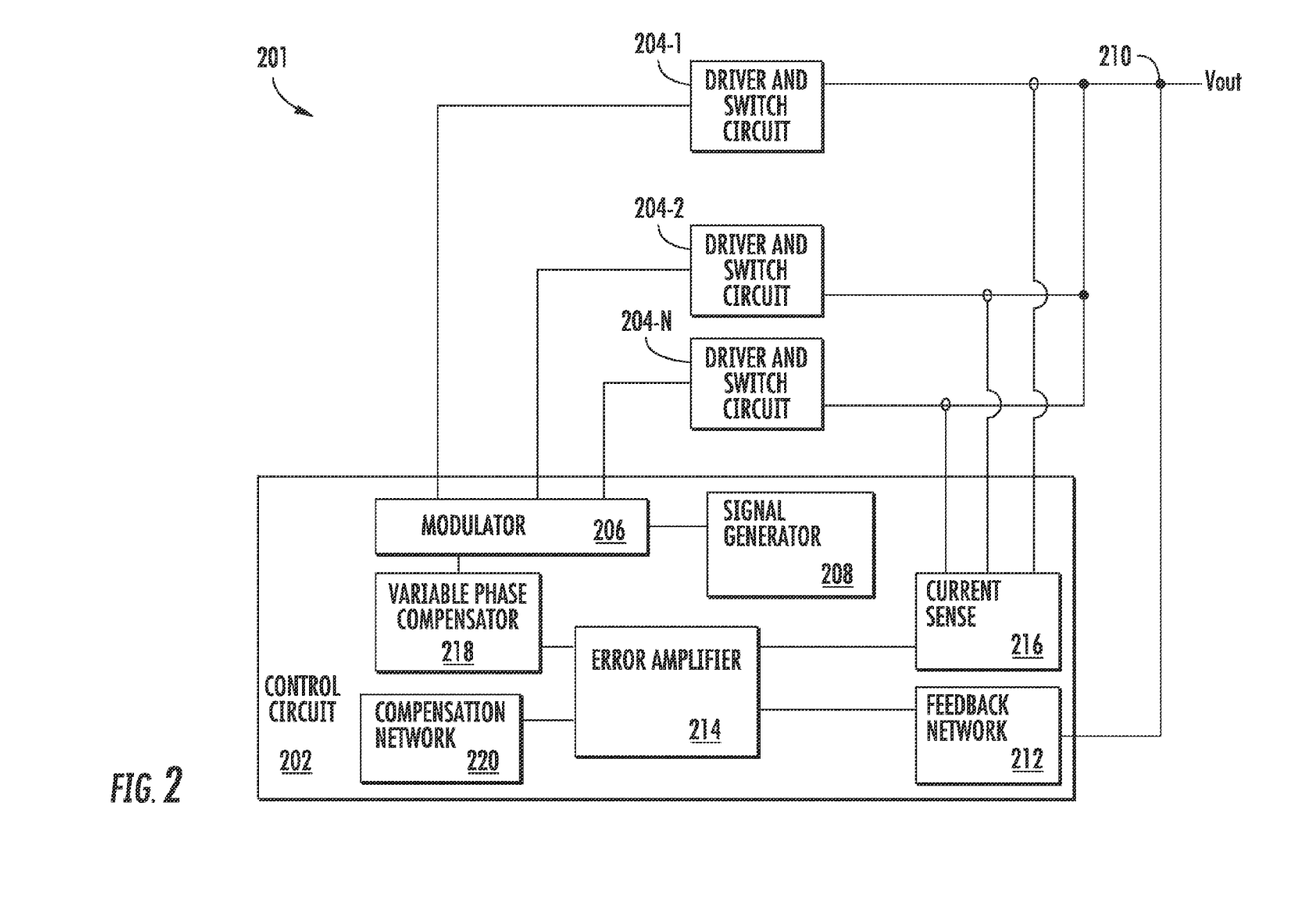
FIG. 2 is a block diagram of one embodiment of a variable phase voltage regulator.

FIG. 2 is a high level block diagram depicting one embodiment of a variable phase voltage regulator 201 which can be implemented in the system 100 above. Variable phase voltage regulator 201 includes a control circuit 202 and a plurality of driver and switch circuits 204-1 . . . 204-N (also referred to herein as phases) coupled to the control circuit 202. Although three phases 204 are shown in FIG. 2, it is to be understood that a different number of phases 204 may be employed in other implementations. In this exemplary embodiment, variable phase voltage regulator 201 is implemented as a multi-phase buck-mode pulse width modulation (PWM) DC-DC converter. However, it is to be understood that, in other embodiments, voltage regulator 201 can be implemented as other types of multi-phase voltage regulators, such as, but not limited to boost-mode and buck-boost mode converters.

The control circuit 202 comprises modulator 206 which provides a respective PWM signal (also referred to as a control signal) to each of phases 204-1 . . . 204-N. The modulator 206 generates the PWM signals based on a ramp signal (Vramp) from signal generator 208 and a difference signal from the error amplifier 214. In some embodiments, the ramp signals are analog signals, whereas in other embodiments, the ramp signals are digital ramp signals.

In response to the PWM signal, each phase 204-1 ... 204-N, when active, regulates an input voltage signal, Vin, and provides the regulated voltage to a common output node 210 to output an output voltage signal, VOUT, to a load. In particular, phases 204-1 ... 204-N in an active state (i.e. active phases) are operable to stagger providing the regulated voltage to the common node 210 to reduce voltage ripple in the VOUT signal.

In addition, a signal representative of the VOUT signal is fed back via a feedback network 212 to a voltage error amplifier 214 in the control circuit 202. Each of the phases 204 is also coupled to a current sense circuit 216 in the control circuit 202. The voltage error amplifier 214 is coupled to the current sense circuit 216 and to the modulator 206, which adjusts the duty ratio of the PWM signals to maintain the VOUT signal at node 210 within a prescribed set of parameters. The parameters might include, for example, a droop or gain parameter defining a fixed ratio amount that the voltage of VOUT decreases in response to increasing load current.

The voltage regulator 201 selectively switches each of the plurality of phases 204 between an active state and a non-active state (i.e. each phase is turned on or off). For example, the voltage regulator 201 selectively switches the state of each of the plurality of phases 204 based on automatic detection of the current and/or voltage demands of the load, in some embodiments. In other embodiments, the phases 204 are selectively turned on and off based on a signal from the load, such as a power-state indicator (PSI#) which is provided to the variable phase voltage regulator from the load to indicate a light-load condition.

The voltage regulator 201 includes a variable phase compensator 218 to compensate for the change in the equivalent inductance of the voltage regulator 201 when the number of active phases changes. Variable phase compensator 218 amplifies an output of the error amplifier 214 which substantially negates the effect of the change in equivalent inductance. In particular, the amplification is proportional (e.g. a constant multiple) to the ratio of the number of active phases to the total number of phases in the voltage regulator 201. In some embodiments, variable phase compensator 218 is implemented as part of the modulator 206, as described below and shown in FIG. 4. In other embodiments, the variable phase compensator 218 is implemented as a separate circuit, such as a high pass filter, which is inserted between the error amplifier 214 and the modulator 206, as described below and shown in FIG. 3.

By compensating for the change in equivalent inductance through the variable phase compensator 218, the voltage regulator 201 produces a fast response to load transients while maintaining stability with adequate gain and phase margin. Additionally, only a single fixed compensation network 220 is included in the voltage regulator 201. The compensation network 220 can be designed to allow for fast response when operating in all-phase mode while reducing the number of output capacitors used to keep the output voltage well regulated. In addition, the poles and zeros of the compensation network 220 can be chosen to help compensate for the double pole at the LC resonant frequency generated by the output inductors and capacitor to improve stability margin. Thus, by enabling the use of a single compensation network, voltage regulator 201 is not overdesigned with additional components which reduces the cost and complexity of the voltage regulator 201.

Furthermore, voltage regulator 201 enables more than two different modes of operation. For example, if the total number of possible phases is 4, voltage regulator 201 provides fast transient response and stability for each of 4-phase, 3-phase, 2-phase, and 1-phase operation. This flexibility increases the efficiency of the voltage regulator 201.

Figure 3:
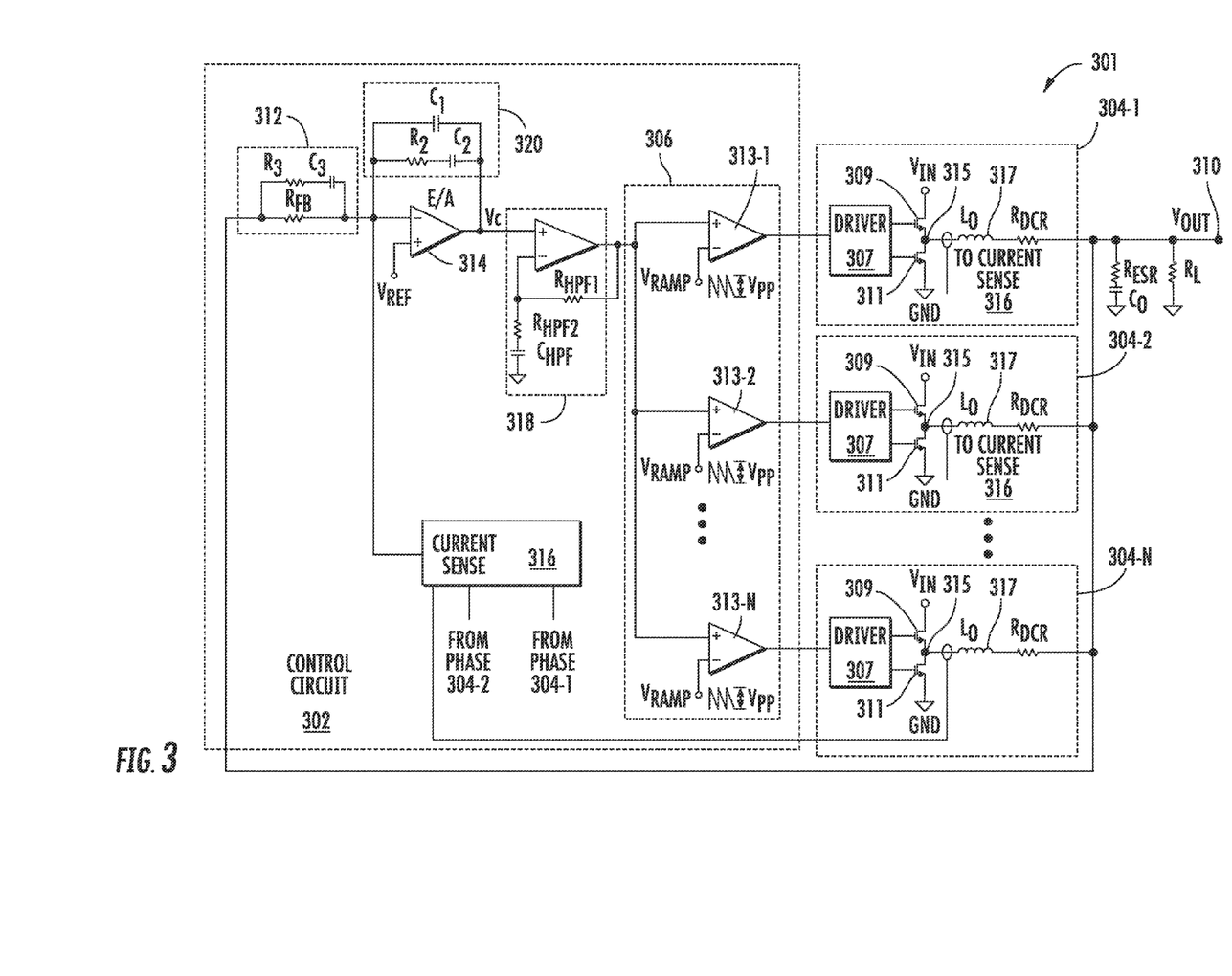
FIG. 3 is a circuit diagram of one embodiment of a variable phase voltage regulator.

FIG. 3 is a circuit diagram showing one embodiment of a variable phase voltage regulator 301. As with variable phase voltage regulator 201, voltage regulator 301 includes a control circuit 302 and a plurality of phases 304-1 ... 304-N. Each phase 304, in this exemplary embodiment, includes a driver 307 which controls the turn-on and turn-off of a pair of electronic power switching devices 309 and 311 based on PWM signal received from a corresponding comparator 313 in modulator 306. In particular, the driver 307 generates an upper gate switching signal provided to the control terminal (e.g., gate) of the upper (or high side) switch 309 and a lower gate switching signal provided to the control terminal of the lower (or low side) switch 311. In the particular configuration shown, the switches 309 and 311 are implemented as N-channel metal-oxide semiconductor field-effect transistors (MOSFETs) having their drain-source current paths coupled in series between a pair of power supply rails (e.g., VIN and ground (GND)). The drain of switch 309 is coupled to the source of switch 311 at a phase node 315, which is coupled to one end of an output inductor 317. The other end of the inductor 317 in each phase 304 is coupled to the output node 310.

The phase node 315 in each phase 304 is also coupled to the current sense circuit 316 which senses the current output from each phase 304. The sensed current is provided to the error amplifier 318. In addition, a voltage feedback loop provides the sensed output voltage from node 310 to the error amplifier 318 via feedback network 312. When reducing the number of active phases, the equivalent inductance in the small signal model of the voltage regulator 301 changes As shown in FIG. 3, the variable phase compensator 318 is implemented as a high pass filter in this embodiment. Variable phase compensator 318 can be implemented as any type of high pass filter. For example, in embodiments utilizing a digital control circuit 302, variable phase compensator 318 can be implemented as a digital high pass filter. For implementations utilizing a digital control circuit, the current and voltage feedback signals are converted from analog to digital signals. The digital control circuit then operates on the digital signals.

Inserting variable phase compensator 318 between the output of the error amplifier 314 and the modulator 306 compensates for the loss of gain in the equivalent LC filter of the phases 304-1 ... 304-N. Implementing the variable phase compensator 318 as a high pass filter also helps ensure that the output of the error amplifier 314 converges to the same voltage irrespective of the number of active phases being used. In particular, variable phase compensator 318 amplifies an output of the error amplifier 314. The amplification is proportional to the ratio of the total number of phases in the voltage regulator 301 to the number of active phases. In particular, in some embodiments, the amplification is equal to the ratio of the total number of phases in the voltage regulator 301 to the number of active phases.

The gain and phase curves and small signal response of exemplary voltage regulator 301 are approximately the same for any number of active phases if the amplification of the variable phase compensator 318 is set to the ratio of the total number of phases in the voltage regulator 301 to the total number of active phases. For example, if the total number of phases in voltage regulator 301 is 4 phases and the number of active phases goes from 4 to 1 then the equivalent inductance goes from ¼*Lo to Lo. The amplification at frequencies above the pole frequency of the high pass filter is then substantially equal to 4. When the voltage regulator 301 is operating in all-phase mode, the amplification is substantially equal to 1.

The equation below shows a relationship between the number of phases and the exemplary variable phase compensator 318.

$$\frac{Rhpf1 + Rhpf2}{Rhpf2} = \frac{NPH}{NA},$$

where NPH is the total number of phases and NA is the number of active phases.

In the above equation, Rhpf1 and/or Rhpf2 can be implemented as variable resistors. Thus, the control circuit 302 varies the value of the resistor Rhpf1 and/or Rhpf2 based on the operating conditions, such as the number of active phases, to adjust the amplification of the difference signal that is output from the error amplifier 314. For example, in some embodiments, Rhpf2 has a fixed value and Rhpf1 is implemented as a variable resistor.

One guideline for selecting the parameters of the variable phase compensator 318, in some implementations, is setting the pole/zero frequency of the variable phase compensator 318 to be much less than the equivalent LC filter resonant frequency. Since the gain and phase curves and small signal response of exemplary voltage regulator 301 are approximately the same for any number of active phases, the number of components used in the compensation network 320 and feedback network 312 can be reduced for the all-phase mode which improves efficiency and cost of the voltage regulator 301.

Figure 4:
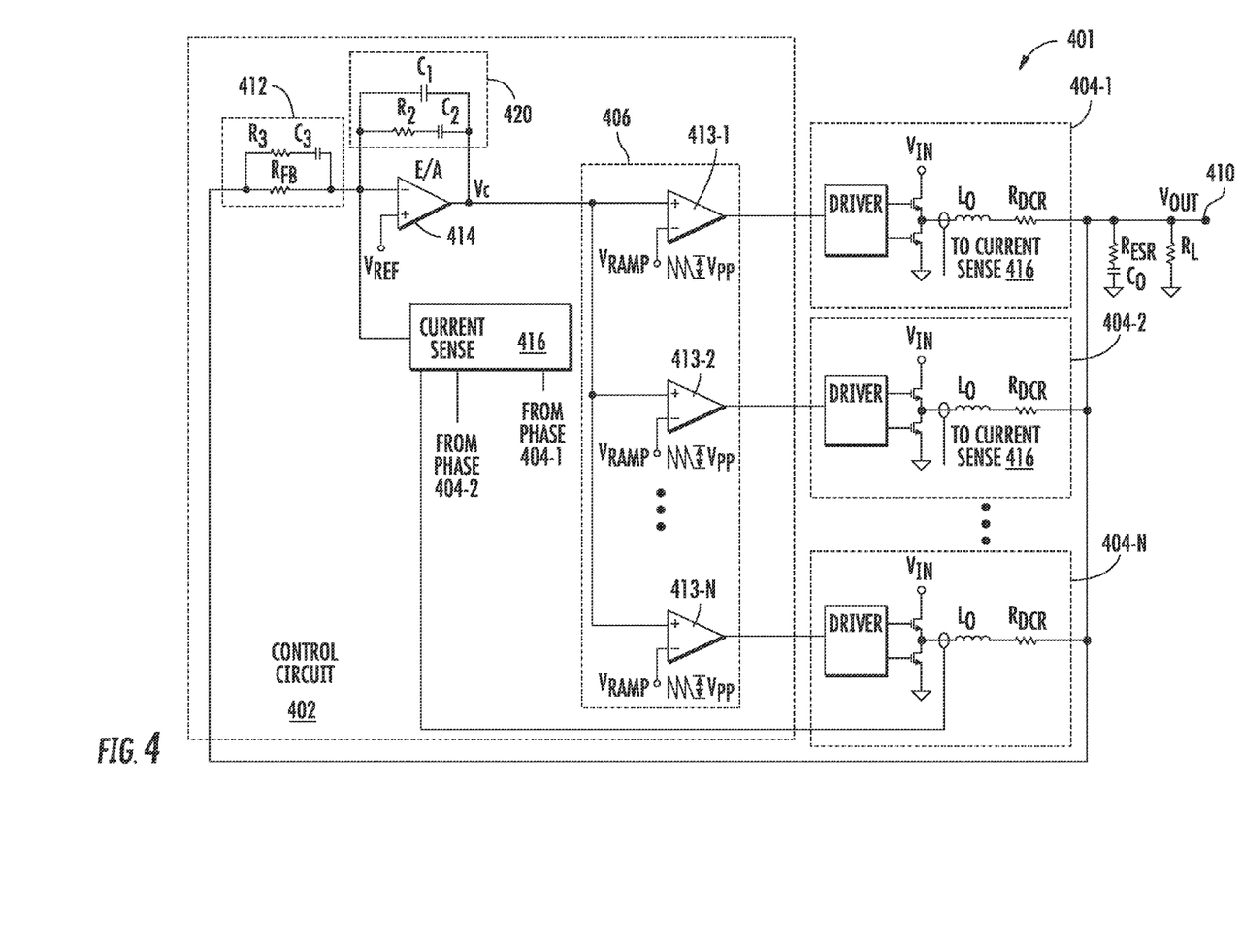
FIG. 4 is a circuit diagram of another embodiment of a variable phase voltage regulator.

An alternative embodiment of a variable phase voltage regulator 401 is shown in FIG. 4. The variable phase voltage regulator also enables a fast transient response while remaining stable without switching in additional compensation networks or overdesigning the voltage regulator 401. The voltage regulator 401 operates similar to voltage regulator 301. However, in the embodiment of FIG. 4, the variable phase compensator is implemented as part of the modulator 406 rather than as a high pass filter between the error amplifier 414 and the modulator 406 as in the embodiment of FIG. 3.

In particular, the modulator gain is determined by dividing Vin by Vpp. Vpp is controlled by the ramp signal, Vramp, which is generated by a signal generator such as signal generator 208 in FIG. 2. Hence, the current source magnitude is adjusted to adjust the slope of Vramp and the peak-to-peak amplitude of the voltage Vpp. In particular, the voltage Vpp and the slope of Vramp are adjusted such that the modulator 406 amplifies the difference signal proportional to the ratio of the total number of phases to the number of active phases. Hence, the compensation network 420 and feedback network 412 can be designed for the all-phase mode to reduce the number of components used which improves efficiency and cost of the voltage regulator 401. Thus, the variable phase voltage regulator 401 also enables fast transient response for more than two modes of operation, similar to the exemplary voltage regulator 301.

However, changing the modulator gain could change the DC operating point of the voltage regulator 401 whereas, inserting a high pass filter, as in voltage regulator 301, provides the desired gain while keeping the same DC operating point. In some implementations, the DC operating point is measured and an offset correction is applied to the circuit to compensate for a difference in the measured DC operating point and a calculated DC operating point. However, it is to be understood that other techniques can be used to compensate for changes in the DC operating point.

Figure 5:
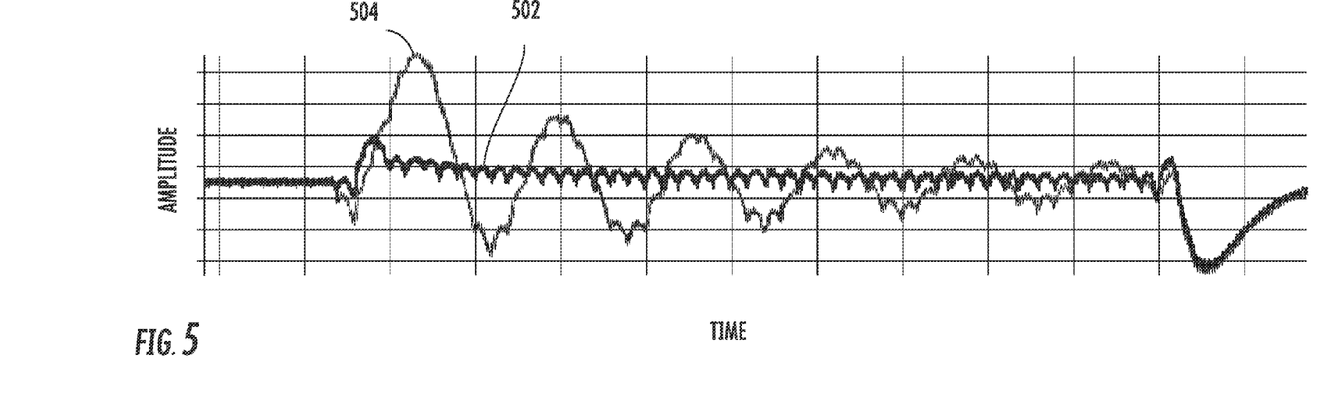
FIG. 5 depicts waveforms of an exemplary phase transition transient response of one embodiment of a variable phase voltage regulator having a variable phase compensator and an exemplary phase transition transient response of a variable phase voltage regulator without the variable phase compensator.

FIG. 5 depicts waveforms of an exemplary phase transition transient response 502 of one embodiment of a variable phase voltage regulator having a variable phase compensator, such as voltage regulator 301, and of an exemplary phase transition transient response 504 of a variable phase voltage regulator without the variable phase compensator described above in FIGS. 2-4. As shown in FIG. 5, the output voltage 504 of a variable phase voltage regulator without the variable phase compensator has much larger disturbance on the output voltage than the phase transition transient response 502 of a variable phase voltage regulator with the variable phase compensator, such as voltage regulators 301 or 401. In addition, the phase transition transient response 504 rings close to oscillation so there may be times when it is unstable or could be unstable. Hence, the embodiments of a variable phase voltage regulator, such as 301 or 401, provide a fast and stable phase transition transient response.

Figure 6:
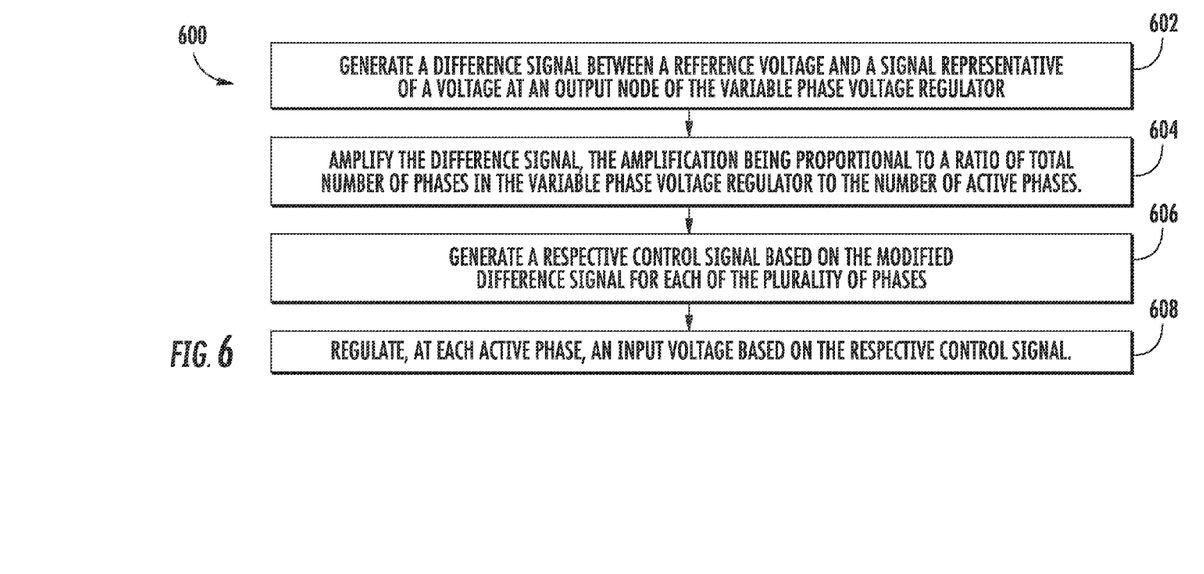
FIG. 6 is a flow chart depicting one embodiment of a method of equalizing the small signal response of a variable phase voltage regulator.

FIG. 6 is a flow chart depicting one embodiment of a method 600 of equalizing the small signal response of a variable phase voltage regulator. At block 602, a difference signal is generated. The difference signal is based on a difference between a reference voltage and a signal representative of a voltage at an output node of the variable phase voltage regulator. At block 604, the difference signal is amplified to produce a modified difference signal. The amplification is proportional to a ratio of the total number of phases in the variable phase voltage regulator to the number of active phases in the variable phase voltage regulator. This amplification helps compensate for effects of varying the number of active phases in the variable phase voltage regulator. In some embodiments, the difference signal is amplified by passing the difference signal through a high pass filter, as described above. In other embodiments, the difference signal is amplified in a modulator based on a signal from a signal generator, as described above.

At block 606, a respective control signal based on the modified difference signal is generated for each of the plurality of phases. At block 608, an input voltage is regulated at each active phase based on the respective control signal.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A variable phase voltage regulator comprising:
a plurality of phases, wherein individuals phases of the plurality of phases are operable to be selectively switched between an active state and a non-active state; and
a control circuit comprising:
an error amplifier to generate a difference signal based on a difference between a reference voltage and a signal representative of a regulated voltage at an output node of the variable phase voltage regulator; and
a variable phase compensator to amplify the difference signal to produce a modified difference signal, wherein the amplification is proportional to a ratio of total number of phases in the plurality of phases to number of phases in the active state;

wherein the control circuit generates a respective control signal based on the modified difference signal for each of the plurality of phases; and wherein each phase in the active state regulates an input voltage based on the respective control signal and provides the regulated voltage at the output node of the variable phase voltage regulator.

2. The variable phase voltage regulator of claim 1, wherein the total number of phases in the plurality of phases is four.

3. The variable phase voltage regulator of claim 1, wherein the variable phase voltage regulator is a variable phase buck-mode pulse width modulation (PWM) DC-DC converter.

4. The variable phase voltage regulator of claim 1, wherein the control circuit is implemented as a digital control circuit.

5. The variable phase voltage regulator of claim 1, wherein the control circuit further comprises:
 a modulator to generate the respective control signals based on the modified difference signal and a signal from a signal generator;
 wherein the variable phase compensator is a high pass filter coupled between the error amplifier and the modulator.

6. The variable phase voltage regulator of claim 1, wherein the variable phase compensator is implemented in a modulator configured to generate the respective control signals; wherein the modulator is further configured to amplify the difference signal based on a signal from a signal generator.

7. The variable phase voltage regulator of claim 1, wherein each of the plurality of phases comprises:
 a first switching device having a first terminal and a second terminal, the first terminal of the first switching device coupled to the input voltage and the second terminal of the first switching device coupled to a phase node;
 a second switching device having a first terminal and a second terminal, the first terminal of the second switching device coupled to the phase node and the second terminal of the second switching device coupled to ground;
 a driver to control turning on and off each of the first and second switching devices based on the respective control signal from the control circuit; and
 an inductor coupled between the phase node and the output node of the variable phase voltage regulator.

8. A system comprising:
 a power source operable to provide a voltage signal;
 a variable phase voltage regulator operable to regulate the voltage signal from the power source, the variable phase voltage regulator having a plurality of phases, each phase operable to be selectively switched between an active state and a non-active state; and
 a load coupled to the variable phase voltage regulator to receive the regulated voltage signal;
 wherein the variable phase voltage regulator amplifies a signal used in controlling the plurality of phases, the amplification being proportional to a ratio of total number of phases in the plurality of phases to number of phases in the active state.

9. The system of claim 8, wherein the total number of phases in the plurality of phases of the variable phase voltage regulator is four.

10. The system of claim 8, wherein the variable phase voltage regulator is a variable phase buck-mode pulse width modulation (PWM) DC-DC converter.

11. The system of claim 8, wherein the load comprises one of a processor, a display device, or a memory device.

12. The system of claim 8, wherein the variable phase voltage regulator comprises:

an error amplifier to generate a difference signal based on a difference between a reference voltage and a signal representative of a regulated voltage at an output node of the variable phase voltage regulator; and
 a variable phase compensator to amplify the difference signal to produce a modified difference signal;
 wherein the variable phase voltage regulator generates a respective control signal based on the modified difference signal for each of the plurality of phases; and
 wherein each phase in the active state regulates the voltage signal from the power source based on the respective control signal and provides the regulated voltage signal at the output node of the variable phase voltage regulator.

13. The system of claim 12, wherein the variable phase voltage regulator further comprises:
 a modulator to generate the respective control signals based on the modified difference signal and a signal from a signal generator;
 wherein the variable phase compensator is a high pass filter coupled between the error amplifier and the modulator.

14. The system of claim 12, wherein the variable phase compensator is implemented in a modulator configured to generate the respective control signals; wherein the modulator is further configured to amplify the difference signal based on a signal from a signal generator.

15. The system of claim 1, wherein each of the plurality of phases in the variable phase voltage regulator comprises:
 a first switching device having a first terminal and a second terminal, the first terminal of the first switching device coupled to the input voltage and the second terminal of the first switching device coupled to a phase node;
 a second switching device having a first terminal and a second terminal, the first terminal of the second switching device coupled to the phase node and the second terminal of the second switching device coupled to ground;
 a driver to control turning on and off each of the first and second switching devices based on the respective control signal from the control circuit; and
 an inductor coupled between the phase node and the output node of the variable phase voltage regulator.

16. A control circuit for a variable phase voltage regulator, the control circuit comprising:
 an error amplifier to generate a difference signal based on a difference between a reference voltage and a signal representative of a voltage at an output node of the variable phase voltage regulator; and
 a variable phase compensator to amplify the difference signal to produce a modified difference signal to compensate for effects of varying the number of active phases in the variable phase voltage regulator, wherein the amplification is proportional to a ratio of total number of phases in the variable phase voltage regulator to number of active phases in the variable phase voltage regulator.

17. The control circuit of claim 16, wherein the control circuit further comprises:
 a modulator to generate a respective control signal for each phase in the variable phase voltage regulator based on the modified difference signal and a signal from a signal generator;
 wherein the variable phase compensator is a high pass filter coupled between the error amplifier and the modulator.

18. The control circuit of claim 16, wherein the variable phase compensator is implemented in a modulator configured to generate a respective control signal for each phase in the variable phase voltage regulator; wherein the modulator is further configured to amplify the difference signal based on a signal from a signal generator.

19. A method of equalizing a small signal response of a variable phase voltage regulator, the method comprising:
   generating a difference signal based on a difference between a reference voltage and a signal representative of a regulated voltage at an output node of the variable phase voltage regulator;
   amplifying the difference signal to produce a modified difference signal, wherein the amplification is proportional to a ratio of total number of phases in the variable phase voltage regulator to number of active phases in the variable phase voltage regulator; and
   generating a respective control signal based on the modified difference signal for each of the plurality of phases.

20. The method of claim 19, further comprising:
   regulating, at each active phase, an input voltage based on the respective control signal.

21. The method of claim 19, wherein amplifying the difference signal comprises passing the difference signal through a high pass filter.

22. The method of claim 19, wherein amplifying the difference signal comprises amplifying the difference signal in a modulator based on a signal from a signal generator.

* * * * *